United States Patent
Strauss et al.

(10) Patent No.: US 11,283,743 B1
(45) Date of Patent: *Mar. 22, 2022

(54) TECHNIQUES FOR SCAM DETECTION AND PREVENTION

(71) Applicant: Facebook, Inc., Menlo Park, CA (US)

(72) Inventors: Emanuel Alexandre Strauss, San Mateo, CA (US); Muhammad Saif Farooqui, Singapore (SG); Rehman Mehdi Muhammad, Austin, TX (US); Michelle Ruby Hwang, Seattle, WA (US); Nicolas Scheffer, San Francisco, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 16/519,685

(22) Filed: Jul. 23, 2019

Related U.S. Application Data

(63) Continuation of application No. 15/642,579, filed on Jul. 6, 2017, now Pat. No. 10,412,032.

(51) Int. Cl.
| | |
|---|---|
| *G06F 15/16* | (2006.01) |
| *H04L 51/00* | (2022.01) |
| *H04L 29/06* | (2006.01) |
| *G06N 20/00* | (2019.01) |
| *H04L 69/329* | (2022.01) |

(Continued)

(52) U.S. Cl.
CPC ............. *H04L 51/12* (2013.01); *G06N 20/00* (2019.01); *H04L 29/08072* (2013.01); *H04L 63/1408* (2013.01); *H04L 63/1441* (2013.01); *G06N 3/0445* (2013.01); *G06N 3/0454* (2013.01); *H04L 51/32* (2013.01)

(58) Field of Classification Search
CPC ... H04L 51/12; H04L 51/32; H04L 29/08072; H04L 63/1408; H04L 63/1441; G06N 20/20; G06N 20/00
USPC ................................ 709/220, 224, 226, 228
See application file for complete search history.

(56) References Cited

U.S. PATENT DOCUMENTS

| | | | | |
|---|---|---|---|---|
| 6,226,623 | B1 * | 5/2001 | Schein | G06Q 30/02 |
| | | | | 705/35 |
| 9,704,177 | B2 * | 7/2017 | Dawson | G06Q 10/107 |
| 10,009,440 | B2 * | 6/2018 | Deb | G06Q 50/01 |

(Continued)

*Primary Examiner* — Khanh Q Dinh

(74) *Attorney, Agent, or Firm* — Kacvinsky Daisak Bluni PLLC

(57) ABSTRACT

Techniques for scam detection and prevention are described. In one embodiment, an apparatus may comprise an interaction processing component operative to generate a scam message example repository; submit the scam message example repository to a natural-language machine learning component; and receive a scam message model from the natural-language machine learning component in response to submitting the scam message example repository; an interaction monitoring component operative to monitor a plurality of messaging interactions with a messaging system based on the scam message model; and determine a suspected scam messaging interaction of the plurality of messaging interactions; and a scam action component operative to perform a suspected scam messaging action with the messaging system in response to determining the suspected scam messaging interaction. Other embodiments are described and claimed.

14 Claims, 10 Drawing Sheets

(51) Int. Cl.
   *H04L 51/52*      (2022.01)
   *G06N 3/04*       (2006.01)

(56)         References Cited

U.S. PATENT DOCUMENTS

| | | | |
|---|---|---|---|
| 10,412,032 B2 * | 9/2019 | Strauss | H04L 63/1441 |
| 2001/0018674 A1 * | 8/2001 | Schein | H04L 29/06 |
| | | | 705/35 |
| 2004/0055017 A1 * | 3/2004 | Delpuch | H04N 21/435 |
| | | | 725/110 |
| 2006/0212930 A1 * | 9/2006 | Shull | H04L 63/08 |
| | | | 726/10 |
| 2006/0212931 A1 * | 9/2006 | Shull | H04L 63/104 |
| | | | 726/10 |
| 2009/0187764 A1 * | 7/2009 | Astakhov | H04L 9/3263 |
| | | | 713/170 |
| 2011/0010374 A1 * | 1/2011 | Yang | G06F 16/9535 |
| | | | 707/754 |
| 2016/0359793 A1 * | 12/2016 | Kraios | H04L 51/12 |
| 2017/0230323 A1 * | 8/2017 | Jakobsson | H04L 63/1433 |
| 2018/0240131 A1 * | 8/2018 | Denner | G06Q 50/01 |
| 2018/0351897 A1 * | 12/2018 | Istrati | H04W 88/184 |
| 2020/0067861 A1 * | 2/2020 | Leddy | H04L 51/12 |
| 2020/0067978 A1 * | 2/2020 | Jakobsson | H04L 63/1416 |

\* cited by examiner

500

Generate a scam message example repository.
502

Submit the scam message example repository to a natural-language machine learning component.
504

Receive a scam message model from the natural-language machine learning component in response to submitting the scam message example repository.
506

Monitor a plurality of messaging interactions with a messaging system based on the scam message model.
508

Determine a suspected scam messaging interaction of the plurality of messaging interactions.
510

Perform a suspected scam messaging action with the messaging system in response to determining the suspected scam messaging interaction.
512

TECHNIQUES FOR SCAM DETECTION AND PREVENTION

CROSS-REFERENCE TO RELATED APPLICATIONS

This application is a continuation of and claims the benefit of priority to U.S. patent application Ser. No. 15/642,579, titled "TECHNIQUES FOR SCAM DETECTION AND PREVENTION," filed on Jul. 6, 2017, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging applications, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for scam detection and prevention. Some embodiments are particularly directed to techniques for scam detection and prevention for a messaging-based marketplace using machine learning on example scam messages. In one embodiment, for example, an apparatus may comprise an interaction processing component operative to generate a scam message example repository; submit the scam message example repository to a natural-language machine learning component; and receive a scam message model from the natural-language machine learning component in response to submitting the scam message example repository; an interaction monitoring component operative to monitor a plurality of messaging interactions with a messaging system based on the scam message model; and determine a suspected scam messaging interaction of the plurality of messaging interactions; and a scam action component operative to perform a suspected scam messaging action with the messaging system in response to determining the suspected scam messaging interaction. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a logic flow for the scam detection and prevention system of FIG. 1.

DETAILED DESCRIPTION

Figure 1:
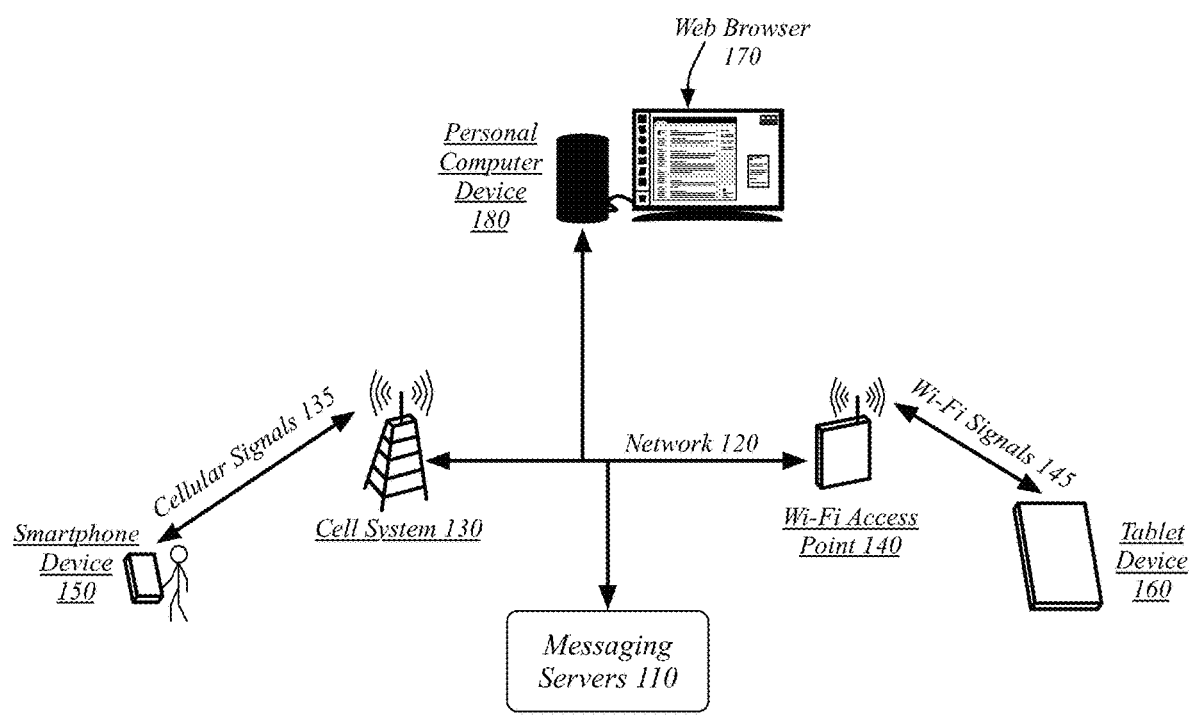
FIG. 1 illustrates an embodiment of a scam detection and prevention system.

A messaging system may support a marketplace where users can connect with each other to buy, sell, trade, and otherwise engage in market transactions. However, some users may engage in scam behavior, engaging in dishonest commerce. Identifying suspected scammers may be used to improve the marketplace for its users. Suspected scammers may be removed from the service, blocked from buying or selling items on the service, and/or may have their transactions subjected to additional monitoring. Similarly, those in communication with suspected scammers may be provided with educational tools about scams or may have scam reporting tools presented to them or made more prominent in a messaging interface. In general, monitoring a messaging-based marketplace for scams and engaging in scam prevention may reduce fraud and increase the reliability of a marketplace for its users, improving the quality of marketplace provided by the messaging system to its users.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a scam detection and prevention system 100. In one embodiment, the scam detection and prevention system 100 may comprise a computer-implemented system having software applications comprising one or more components. Although the scam detection and prevention system 100 shown in FIG. 1 has a limited number of elements in a certain topology, it may be appreciated that the scam detection and prevention system 100 may include more or less elements in alternate topologies as desired for a given implementation.

The messaging servers 110 may comprise one or more messaging servers operated by a messaging system in association with the scam detection and prevention system 100. A messaging server may comprise an Internet-accessible server, with the network 120 connecting the various devices of the scam detection and prevention system 100 comprising, at least in part, the Internet. The scam detection and prevention system 100 may be one component of a larger system that provides messaging services, as well as potentially other services, such as social-networking services.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same or a different user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same or a different user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging system including the messaging servers 110. A dedicated messaging client may be a general client operative to work with a plurality of different messaging providers including the messaging provider administering the messaging system including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for a social networking service, with the computing device providing additional functionality of the social networking service. Similarly, a social networking application may provide both messaging functionality and additional functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. Messaging applications on different devices may comprise installations of the same application on both devices. Messaging applications on different devices may comprise smartphone-specific and tablet-specific versions of a common application. Messaging applications on different devices may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a inbox, a deletion of a message from a inbox, and a read receipt.

A scam detection and prevention system 100 may operate by defining a messaging inbox as comprising a plurality of messages, wherein each message is an individual transaction of communication between two or more participants. A messaging server may operate by maintaining a message index for the messaging inbox. Messaging servers may receive messages and store the messages in message archives from which messages may be retrieved through reference to the message index. Messaging clients may connect to the messaging servers and retrieve messages that have been added to their message archive since their last update. The messaging clients may receive a message index from the message archive indicating what messages are stored in the message archive. The messaging clients may compare the message archive to their current inbox in order to determine what messages they are missing, which they then request from the message archive. The messaging clients may make changes to their inbox, which results in message inbox instructions being transmitted to the message archives instructing the message archives in modifications to make to the representation of their message inbox on the message archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

The scam detection and prevention system 100 may use knowledge generated from interactions in between users. The scam detection and prevention system 100 may comprise a component of a social-networking system and may use knowledge generated from the broader interactions of the social-networking system. As such, to protect the privacy of the users of the scam detection and prevention system 100 and the larger social-networking system, scam detection and prevention system 100 may include an authorization server (or other suitable component(s)) that allows users to opt in to or opt out of having their actions logged by the scam detection and prevention system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the scam detection and prevention system 100 and other elements of a social-networking system through blocking, data hashing, anonymization, or other suitable techniques as appropriate.

Figure 2:
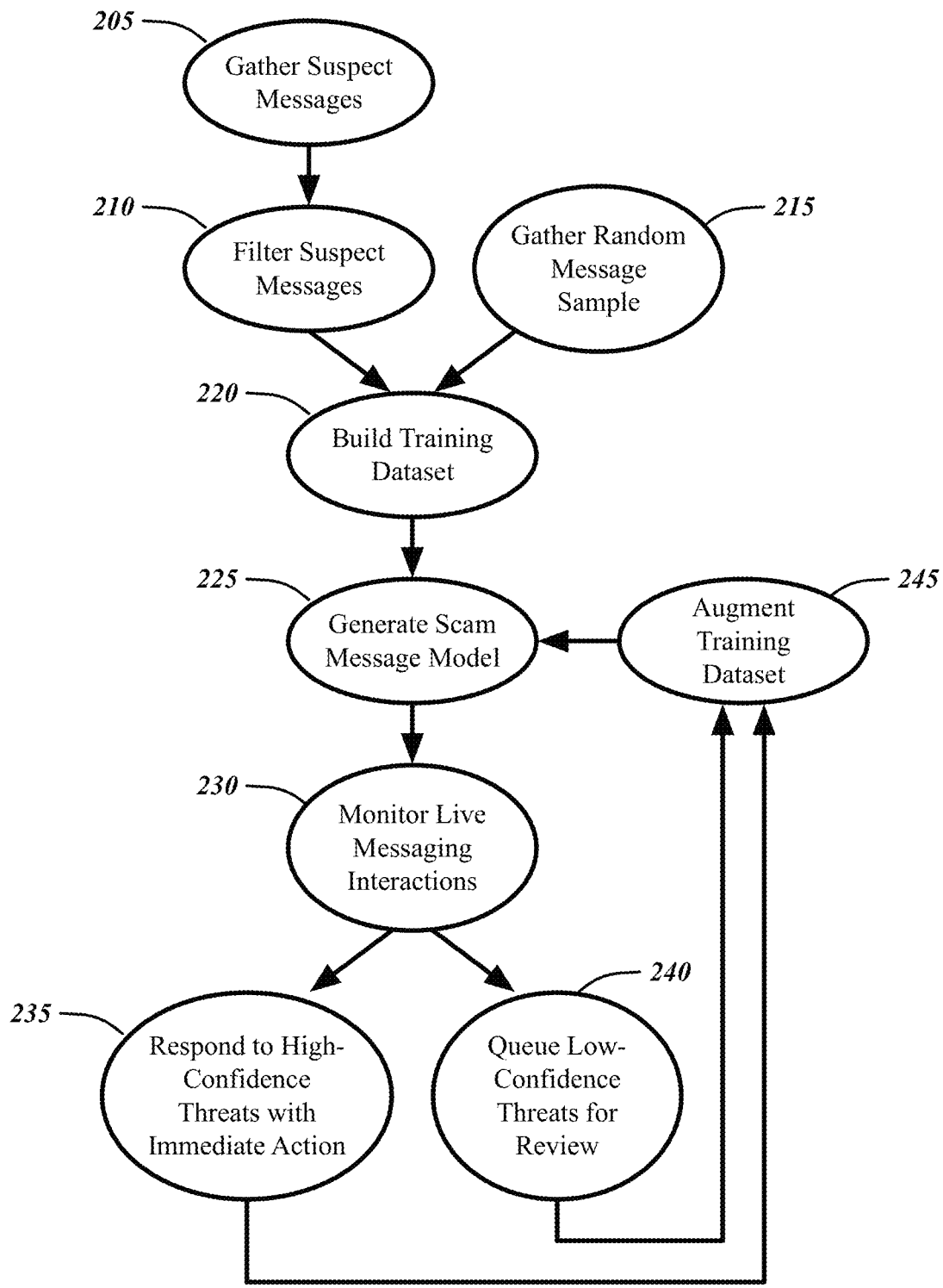
FIG. 2 illustrates an embodiment of a logic flow for scam detection and prevention.

FIG. 2 illustrates an embodiment of a logic flow 200 for scam detection and prevention. The logic flow 200 presents a particular embodiment of a scam detection and prevention system 100. It will be appreciated that the techniques discussed herein may be embodied in various alternative logic flows.

The logic flow 200 may gather suspect messages at block 205. Suspect messages may be gathered bases on meeting defined criteria for suspect messages. For instance, suspect messages may be identified based on a user using repeated messages in multiple message threads. In particular, suspect messages may be identified based on a particular user persistently reusing messages (such as in excess of a reuse threshold) out of proportion with the use of those messages in the general messaging or marketplace community. For example, broad reuse of the phrase "It's a deal!" by many users would not be suspect, while significant reuse of the phrase "Let's discuss this via email instead." by a particular user in contrast with the general messaging population would be suspect. The gathering of suspect messages may be performed without consideration for the content of messages except where analysis of the content of messages is used to detect reuse. The logic flow may then continue to block 210.

The logic flow 200 may filter suspect messages at block 210. The filtering of suspect messages may be performed by submitting the suspect messages to human administrators and receiving the filtered messages in return. The human administrators may be provided with the suspect messages for evaluation as to whether they constitute actual scam behavior, with the filtered messages comprising those suspect messages that meet the human administrator's standards for scam messaging. The logic flow may then continue to block 220.

The logic flow 200 may gather a random message sample at block 215. A random message sample may be gathered using randomization techniques, such as may involve pseudo-random number generation, to select from among the pool of messages of the messaging system. The random message sample may be particularly gathered from a messaging-based marketplace portion of the messaging system to provide a closer comparison to the determined scam messages. The logic flow 200 may then continue to block 220.

The logic flow 200 may build a training dataset at block 220. The logic flow 200 prepared a training dataset for machine-learning analysis. The training dataset comprises a set of possible examples, the filtered suspect messages. The training dataset further comprises a set of negative examples, the random message sample. As the random message sample was gathered randomly, it may incidentally include scam messages due to the possibility of scam messages occurring in messaging interactions for the messaging-based marketplace. However, as long as the incident of scam messaging in the marketplace is a small part of the overall messaging volume, the inclusion of such scam messages in the negative example set will not impair a machine-learning component. The random message sample may be anonymized to protect user privacy in building the training dataset. The logic flow 200 may then continue to block 225.

The logic flow 200 may generate a scam message model at block 225. The scam message model may be generated by submitting the training dataset to a machine-learning component and then receiving the scam message model in response. The logic flow 200 may then continue to block 230.

The logic flow 200 may monitor live messaging interactions at block 230. The live messaging interactions may comprise messaging exchanges in a messaging-based marketplace, as conveyed by messaging servers 110. The live messaging interactions are monitored based on the scam message model to find messages that match the scam message patterns detected by the machine-learning component in the training dataset. The logic flow 200 may then branch based on the degree of recognition of the monitored messaging interactions. The monitoring of live messaging interactions, as a process that runs on each of the messages of the messaging system, may result in branching response for each of those messages. Some messages may show less than a threshold level of scam behavior and result in no activity by the scam detection and prevention system 100. Some messages may show a high-confidence match to scam behavior and result in immediate action, with the logic flow 200 continuing to block 235. Some messages may show a low-confidence match to scam behavior and result in review, with the logic flow continuing to block 240. It will be appreciated that the selection between different responses at different levels of confidence may be implemented.

The logic flow 200 may respond to high-confidence threads with immediate action at block 235. High-confidence threats may comprise those that exceed a defined high-confidence threshold. Immediate action may comprise an explicit ban of the detected scammer, a shadow ban of the detected scammer (i.e., a ban in which the detected scammer is prevented from contacting other users of the messaging-based marketplace without being notified of these measures), scam education for the user engaged in messaging with the detected scammer, and/or promotion of scam tools to the user engaged in messaging with the detected scammer, without limitation. Various thresholds above the base high-confidence threshold may be used to distinguish between the use of different high-confidence actions. The logic flow 200 may then continue to block 245.

The logic flow 200 may queue low-confidence threads for review at block 240. Low-confidence threats may comprise those that exceed a defined low-confidence threshold while not meeting a high-confidence threshold. Low-confidence threats are queued for presentation to and review by human administrators. Human administrators may then respond to the low-confidence threats by dismissing them, carrying out any of the actions described with reference to high-confidence threats, or by taking other action, without limitation. The logic flow may then continue to block 245.

The logic flow 200 may augment the training dataset at block 245. The training dataset may be augmented with additional positive examples collected using various techniques, including, without limitation: the processes of gathering and filtering suspect messages as described with reference to blocks 205 and 210, the confirmation by human administrators of messages detected in the monitoring of live messaging interactions as described with reference to block 230, and/or other techniques. The training dataset may be augmented with additional negative examples collected using various techniques, including, without limitation: the process of gathering and anonymizing random messages samples as described with reference to blocks 215 and 220, the flagging as non-scam by human administrators of messages detected in the monitoring of live messaging interactions as described with reference to block 230, and/or other techniques. The logic flow 200 may then continue to block 225 for the generation of an updated scam message model based on the augmented training dataset.

Figure 3:
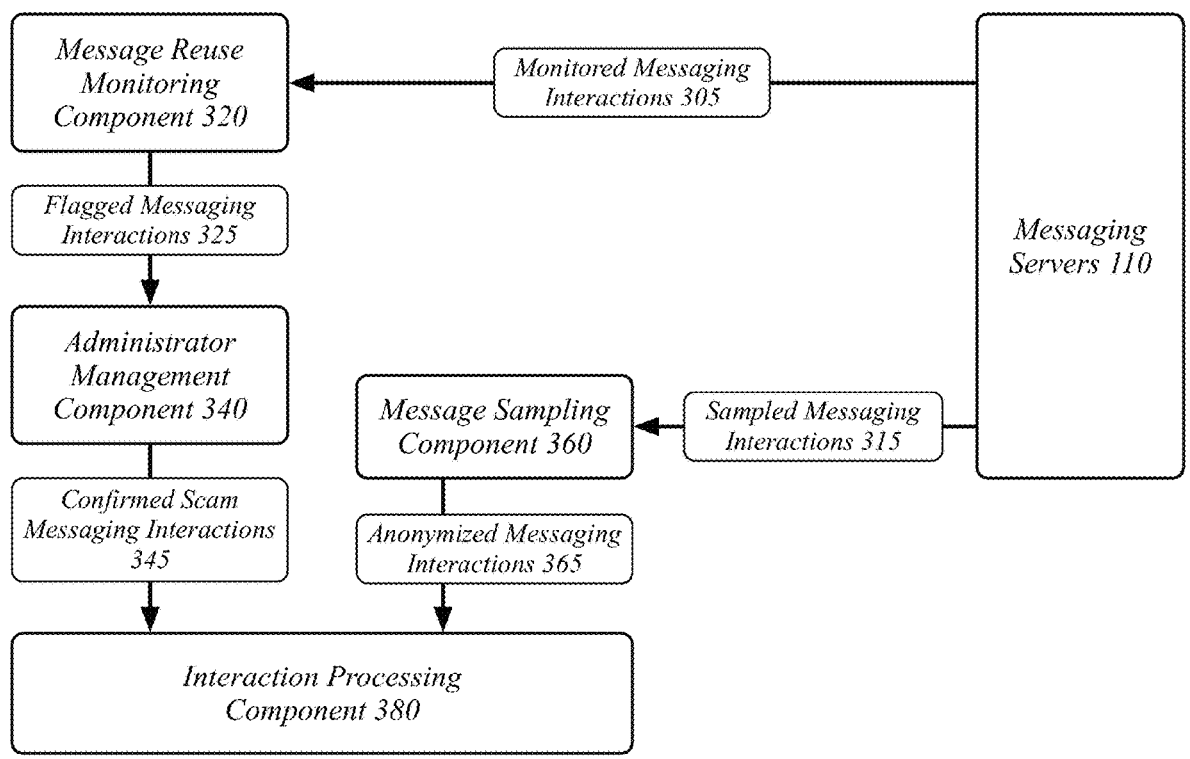
FIG. 3 illustrates an embodiment of example message collection by a scam detection and prevention system.

FIG. 3 illustrates an embodiment of example message collection by a scam detection and prevention system 100.

The scam detection and prevention system 100 includes a message reuse monitoring component 320. The message reuse monitoring component 320 is generally arranged to monitor ongoing messaging interactions for message reuse by examining messages sent via the messaging servers 110. In some embodiments, the scam detection and prevention system 100 may comprise a plurality of message reuse monitoring components, with the work of monitoring for reused messages divided between different message reuse monitoring components. In some embodiments, a message reuse monitoring component 320, such as at least one message reuse monitoring component 320 of a plurality of message reuse monitoring components, may examine every message sent via the messaging servers 110. In other embodiments, only a portion of the messages sent via the messaging servers 110, such as a random sampling of the messages, may be examined by one or more message reuse monitoring components.

The message reuse monitoring component 320 is operative to monitor a plurality of monitored messaging interactions 305 with the messaging servers 110 of a messaging system. The message reuse monitoring component 320 determines a plurality of suspicious messaging interactions based on a message content reuse measure and flags the plurality of suspicious messaging interactions for review to generate a plurality of flagged messaging interactions 325. The message content reuse measure measures the extent to which a particular message is reused in the message-based marketplace. The message content reuse measure distinguishes between broadly-common message content and narrowly-reused message content, such that the message reuse monitoring component 320 flags messages that are reused disproportionally by one user or a small number of users and doesn't flag messages that are broadly or unfirmly reused across the message-based marketplace. In some embodiments, the message reuse monitoring component 320 may operate on live messaging interactions as they happen. In other embodiments, the monitored messaging interactions 305 may be collected and reviewed as a batch.

The scam detection and prevention system 100 includes an administrator management component 340. The administrator management component 340 is generally arranged to manage administrator tasks for performance by human administrators. The flagged messaging interactions 325 are presented to one or more administrators, who confirm or reject each of the flagged messaging interactions 325 as a scam message. The confirmed scam messaging interactions 345 of the flagged messaging interactions 325 are provided to an interaction processing component 380 for inclusion in a training dataset.

The scam detection and prevention system 100 includes a message sampling component 360. The message sampling component 360 is generally arranged to randomly sample messaging interactions sent via the messaging servers 110. The message sampling component 360 is operative to collect a sample of messaging interactions with the messaging system and pass them to an interaction processing component 380 for inclusion in a training dataset. The sampled messaging interactions 315 are selected randomly from the messaging system. The random selection of the sampled messaging interactions 315 may use true randomness or pseudo-random techniques. The message sampling component 360 may anonymize the sample of messaging interactions to generate anonymized messaging interactions 365 for inclusion in the training dataset. Anonymizing the sampled messaging interactions 315 may comprise removing personal information from the sampled messaging interactions 315. Anonymizing the sampled messaging interactions 315 may comprise hashing one or more user identifiers for users involved in the sampled messaging interactions 315. With the user identifiers hashed the scam detection and prevention system 100 is thereby prevented from identifying the users involved in the anonymized messaging interactions 365, which may preserve privacy protections that a messaging system provides to its users.

The scam detection and prevention system 100 includes an interaction processing component 380. The interaction processing component 380 is generally arranged to manage the creation of a training dataset and to oversee machine-learning processes using the training dataset.

Figure 4:
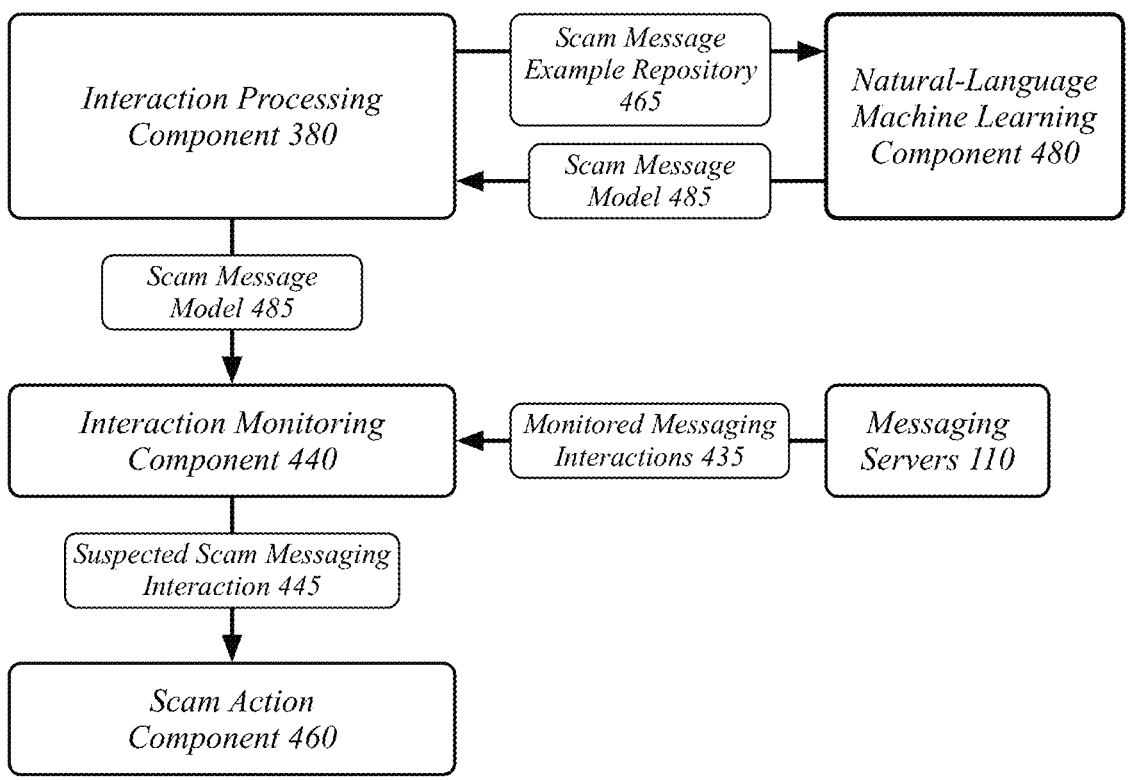
FIG. 4 illustrates an embodiment of messaging interaction monitoring by a scam detection and prevention system.

FIG. 4 illustrates an embodiment of messaging interaction monitoring by a scam detection and prevention system 100.

The interaction processing component 380 is operative to generate a scam message example repository 465. The scam message example repository 465 is a training dataset for generating a scam message model 485 using natural-language machine learning. The interaction processing component 380 interfaces with a natural-language machine learning (NLML) component 480 to generate a scam message model 485. The NLML component 480 may be implemented using known natural language processing (NLP) and machine learning (ML) techniques. The NLML component 480 may use temporal convolution network techniques.

The interaction processing component 380 submits a scam message example repository 465 to the NLML component 480 and receives a scam message model 485 from the NLML component 480 in response. The interaction processing component 380 receives the plurality of confirmed scam messaging interactions 345 and includes the plurality of confirmed scam messaging interactions 345 in the scam message example repository 465. The scam message model 485 is based on distinguishing between high-confidence determined scam message samples and general message interaction samples.

The scam message example repository 465 comprises, at least, the confirmed scam messaging interactions 345 as positive examples of scam messages and the anonymized messaging interactions 365 as negative examples of scam messages, with the positive examples as example scam messages and the negative examples as example non-scam messages. The scam message model 485 models a pattern detected by the NLML component 480 for use in identifying language patterns similar to those used as the positive examples in the scam message example repository 465 as distinguished from the negative examples in the scam message example repository 465.

An initial or primary portion of the scam message example repository 465 may comprise the confirmed scam messaging interactions 345. The interaction processing component 380 may also augment the sample of messaging interactions with positive examples based on one or more of user scam reporting, administrator scam flagging, and regular-expression scam-flagging rules. Messaging interactions reported as scams by users may be added to the scam message example repository 465. In some embodiments, user-reported scam messaging interactions may be confirmed by an administrator prior to inclusion in the scam message example repository 465. Messaging interactions flagged by administrators as scams may be added to the scam message example repository 465. These administrator-flagged scam messaging interactions may comprise messaging interactions reported by a user or may comprise messaging interactions discovered using other techniques, such as random monitoring or automated techniques. In some cases, administrators may compose regular-expression scam-flagging rules, which may detect scam messages. In some embodiments, scam messaging interactions detected based on regular expression may be confirmed by an administrator prior to inclusion in the scam message example repository 465.

In some embodiments, the scam message model 485 is based on individual messages because the NLML component 480 is designed to work on individual messages. The interaction processing component 380 may therefore separate each confirmed scam messaging interaction of the plurality of confirmed scam messaging interactions into one or more scammer-sent messages, wherein including the plurality of confirmed scam messaging interactions in the scam message example repository 465 comprises including the one or more scammer-sent messages for each confirmed scam messaging interaction in the scam message example repository 465. Alternatively, the scam message model 485 may be based on sequenced orderings of messages, such as a multi-message exchange in a message thread between the suspected scammer and another user.

The scam detection and prevention system 100 includes an interaction monitoring component 440. The interaction monitoring component 440 is generally arranged to use the scam message model 485 to monitor messaging interactions for activity associated with scams. The interaction monitoring component 440 is operative to monitor a plurality of monitored messaging interactions 435 with the messaging system based on the scam message model 485. Monitoring the plurality of monitored messaging interactions 435 based on the scam message model 485 may comprise receiving monitored messaging interactions 435 from the messaging servers 110 and matching the monitored messaging interactions 435 against the scam message model 485 using the NLML component 480.

The monitored messaging interactions 435 may correspond to one or more of user-to-user messaging, user-to-business messaging, and user-to-page messaging. User-to-user messaging may comprise messaging between two individual users of the messaging system. User-to-business messaging may comprise messaging between an individual user and a business user account that may be administered by an agent of the business. User-to-page messaging may comprise messaging between an individual user and a page that represents an entity, such as a business. The messaging interactions may correspond to a messaging-based marketplace. In some cases, monitoring the plurality of monitored messaging interactions 435 may include automated translation of one or more of the messaging interactions into a common language used by the scam detection and prevention system 100.

The interaction monitoring component 440 determines a suspected scam messaging interaction 445 of the plurality of messaging interactions using the scam message model 485. The interaction monitoring component 440 reports the suspected scam messaging interaction 445 to a scam action component 460. The interaction monitoring component 440 may detect a plurality of suspected scam messaging interactions as it monitors the messaging system and report each of the suspected scam messaging interactions to the scam action component 460.

The scam detection and prevention system 100 includes a scam action component 460. The scam action component 460 is generally arranged to perform a response to suspected scam messaging interactions. The scam action component 460 is operative to perform a suspected scam messaging action with the messaging system in response to determining the suspected scam messaging interaction 445.

The interaction monitoring component 440 may determine a recognition measure for the suspected scam messaging interaction 445 based on the scam message model 485. The NLML component 480 may provide a recognition measure for each monitored messaging interaction provided to it for analysis based on the scam message model 485. The scam action component 460 then selects the suspected scam messaging action from a plurality of suspected scam messaging actions based on the recognition measure. The recognition measure may comprise a numerical measure indicating a confidence in the match between the monitored messaging interaction and the scam message model 485. A higher value for the recognition measure may indicate a higher confidence.

The scam action component 460 may determine the suspected scam messaging action using the recognition measure based on the plurality of suspected scam messaging actions being ranked by increasing recognition measure thresholds such that more significant and disruptive actions are taken for higher recognition measures. The plurality of suspected scam messaging actions may comprise one, two, or more of a shadow ban action, an explicit ban action, a scam education action, a scam reporting tool promotion action, and a human review flagging action.

A ban action, such as a shadow ban or explicit ban, is a more significant and disruptive action than educating or providing tools to a user, which is a more significant and disruptive action than flagging a messaging interaction for review. In a shadow ban, outgoing messages from the shadow-banned user (e.g., the scammer or suspected scammer) are selected for non-delivery based on the shadow ban without notification to the shadow-banned user that their messages are not being delivered. Similarly, in a shadow ban, offers for sales, or other commerce posts, by the shadow-banned user may be hidden from other users without notification to the shadow-banned user that their posts are not being displayed to others. That is, the shadow-banned user may still compose and see their own posts in the marketplace, and may still compose and see their own outgoing messages, without indication that other users are not also seeing those posts and/or messages. In some embodiments, the shadow-banned user may be allowed to message friends and other contacts in the messaging system outside the marketplace, and to make posts in a messaging system or social-networking system outside the marketplace, but prevented from engaging in actual messaging or actual posting in a marketplace portion—such as a marketplace tab—of the messaging system and/or social-networking system.

In an explicit ban, the experience of the explicitly-banned user (e.g., the scammer or suspected scammer) is explicitly modified such that their ban is not hidden. In some embodiments, an explicit ban may include a message being displayed to the explicitly-banned user that they have been banned. An explicit ban may openly prevent the user from sending messages or making posts in a marketplace. An explicit ban may include the removal of a marketplace tab in a messaging application, such that the marketplace tab control empowering access to the marketplace is removed from the user interface displayed to the explicitly-banned user. Alternatively, an explicit ban may include the deactivation of a marketplace tab in the messaging application, such that the marketplace tab is displayed, but cannot be activated by the user to enter the marketplace. In embodiments in which the marketplace tab is deactivated, the display of the marketplace tab control may be modified, such as by being greyed out or diminished in color, or otherwise visually distinguished from a marketplace tab control that is available to be activated by the user. As with a shadow ban, in some embodiments, an explicitly-banned user may be allowed to message friends and other contacts in the messaging system outside the marketplace, and to make posts in a messaging system or social-networking system outside the marketplace, but prevented from messaging or posting in a marketplace portion—such as a marketplace tab—of the messaging system and/or social-networking system.

Education of a user (e.g., a scammee or suspected scammee) may include a variety of techniques. The user may be shown educational materials communicating one or more of the existence of scams in general, the suspicion of scam behavior by the suspected scammer in particular, techniques for determining whether one is being scammed, instructions regarding the use of scam-reporting tools, and any other educational communication. Educational materials may include text, images, video, audio, animation, or any other form of media. Scam education may include increase the prominence of one or more scam-reporting tools. Increasing the prominence of scam-reporting tools may comprise one or more of, without limitation: increasing the size of a scam-reporting tool, changing the color of a scam-reporting tool, emphasizing the text label of a scam-reporting tool, highlighting a scam-reporting tool, moving a scam-reporting tool to a more prominent screen position, relocating a scam-reporting tool from a menu to an independent on-screen location outside the menu, and adding a copy of a scam-reporting tool locating in a menu to an independent on-screen location outside the menu.

In one implementation, a three-tiered approach may be used, in which low-confidence scam detection results in the suspected scam messaging action of an enqueuer for manual review being taken, a mid-confidence scam detection results in the suspected scam messaging action of scam education for the user being messaged, and a high-confidence scam detection results in the suspected scam messaging action of banning the detected scammer from using the marketplace. A tiered approach may be applied to suspected scam messages determined by either or both of regular-expression scam-flagging rules and analysis according to the scam message model 485.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may generate a scam message example repository at block 502.

The logic flow 500 may submit the scam message example repository to a natural-language machine learning component at block 504.

The logic flow 500 may receive a scam message model from the natural-language machine learning component in response to submitting the scam message example repository at block 506.

The logic flow 500 may monitor a plurality of messaging interactions with a messaging system based on the scam message model at block 508.

The logic flow 500 may determine a suspected scam messaging interaction of the plurality of messaging interactions at block 510.

The logic flow 500 may perform a suspected scam messaging action with the messaging system in response to determining the suspected scam messaging interaction at block 512.

The embodiments are not limited to this example.

Figure 6:
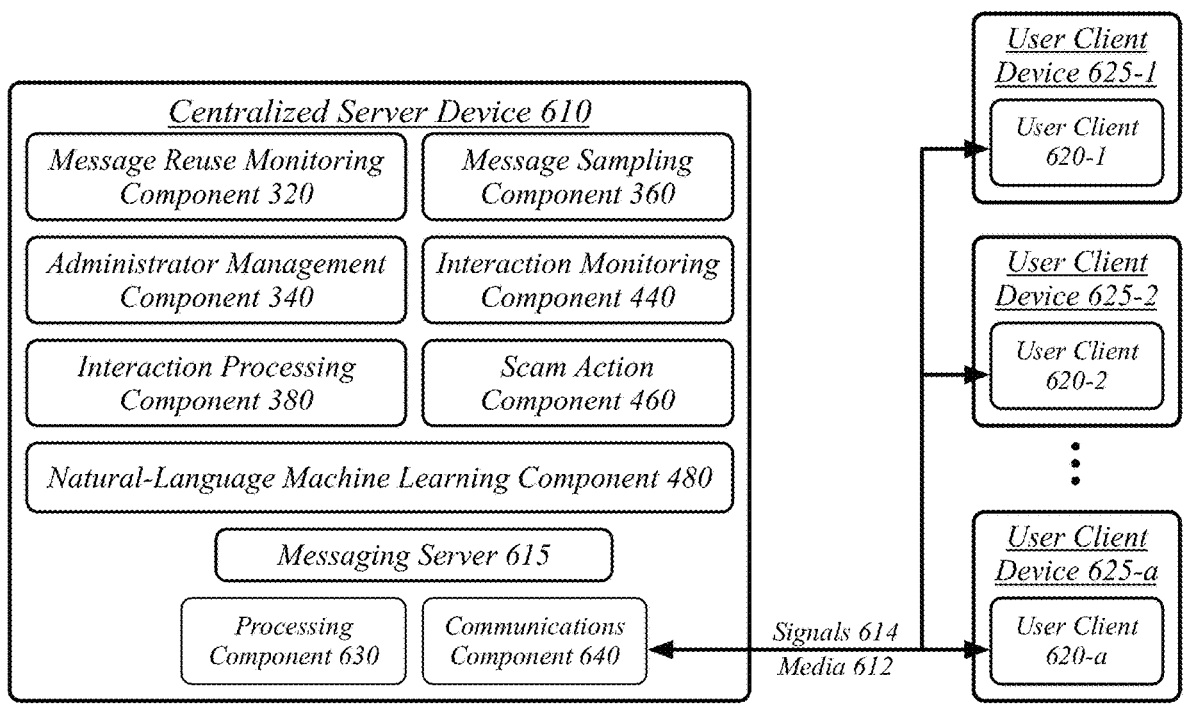
FIG. 6 illustrates an embodiment of a centralized system for the system of FIG. 1.

FIG. 6 illustrates a block diagram of a centralized system 600. The centralized system 600 may implement some or all of the structure and/or operations for the scam detection and prevention system 100 in a single computing entity, such as entirely within a single centralized server device 610.

The centralized server device 610 may comprise any electronic device capable of receiving, processing, and sending information for the scam detection and prevention system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 610 may execute processing operations or logic for the scam detection and prevention system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 610 may execute communications operations or logic for the scam detection and prevention system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 610 may execute a variety of components for the operations of the scam detection and prevention system 100. The centralized server device 610 may execute all of the message reuse monitoring component 320, administrator management component 340, message sampling component 360, interaction processing component 380, interaction monitoring component 440, scam action component 460, natural-language machine learning component 480, and a messaging server 615. The messaging server 615 may perform operations similar to those of the messaging servers 110.

The centralized server device 610 may communicate with other devices over a communications media 612 using communications signals 614 via the communications component 640. The centralized server device may communicate with a plurality of user client devices 625 each executing a user client 620, such as a messaging client, messaging commerce client, and/or social-networking client. As such, the centralized server device 610 may provide, in a single server device, messaging operations, messaging-based marketplace operations, and scam detection and prevention operations for users of the user client devices 625.

Figure 7:
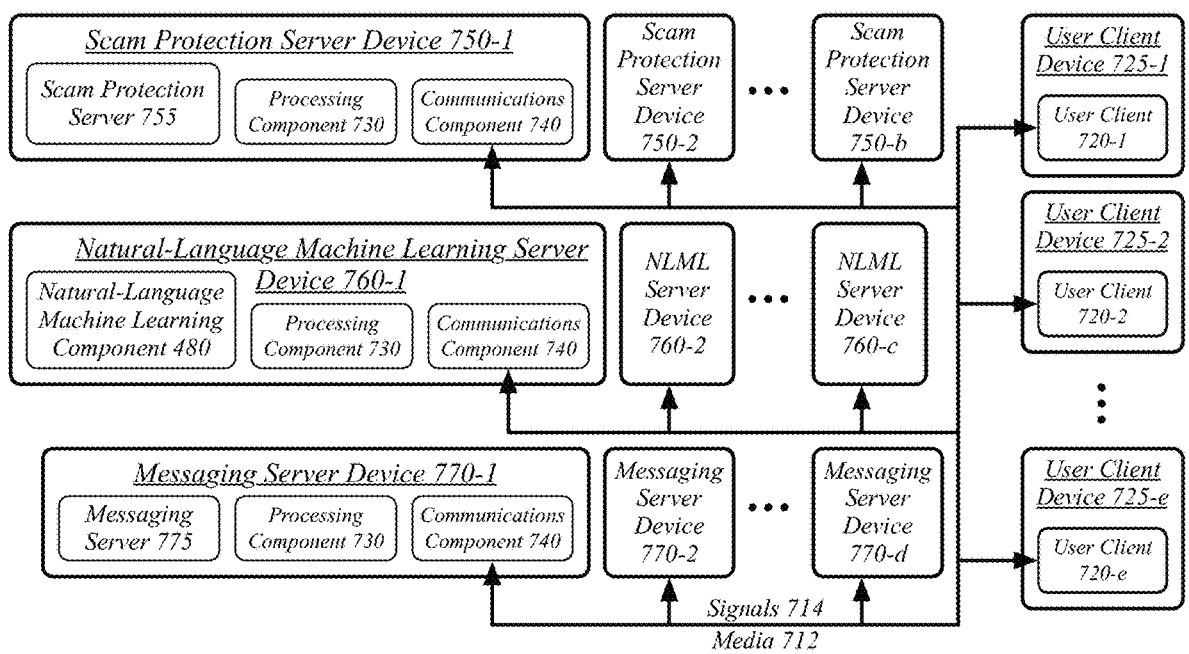
FIG. 7 illustrates an embodiment of a distributed system for the system of FIG. 1.

FIG. 7 illustrates a block diagram of a distributed system 700. The distributed system 700 may distribute portions of the structure and/or operations for the scam detection and prevention system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a plurality of server devices 750, 760, 770. In general, the server devices 750, 760, 770 may be the same or similar to the centralized server device 610 as described with reference to FIG. 6. For instance, the server devices 750, 760, 770 may each comprise a processing component 730 and a communications component 740 which are the same or similar to the processing component 630 and the communications component 640, respectively, as described with reference to FIG. 6. In another example, the server devices 750, 760, 770 may communicate over a communications media 712 using communications signals 714 via the communications components 740.

A plurality of scam protection server devices 750 may comprise or employ one or more programs that operate to perform various methodologies in accordance with the described embodiments. In one embodiment, for example, the plurality of scam protection server devices 750 may each implement a scam protection server 755. The scam protection server 755 may comprise one or more of the message reuse monitoring component 320, administrator management component 340, message sampling component 360, interaction processing component 380, and interaction monitoring component 440, scam action component 460. In some embodiments, various components of these components may be distributed across different server devices.

A plurality of natural-language machine learning server devices 760 may comprise or employ one or more programs that operate to perform various methodologies in accordance with the described embodiments. In one embodiment, for example, the plurality of natural-language machine learning server devices 760 may each execute a natural-language machine learning component 480. The natural-language machine learning server devices 760 may provide natural-language machine learning services to various components of the distributed system 700.

A plurality of messaging server devices 770 may comprise or employ one or more programs that operate to perform various methodologies in accordance with the described embodiments. In one embodiment, for example, the plurality of messaging server devices 770 may each execute a messaging server 775. The messaging server 775 may perform operations similar to those of the messaging servers 110.

In some embodiments, some of the scam detection and prevention components may execute on the messaging server devices 770. In particular, one or more of the message reuse monitoring component 320, message sampling component 360, and interaction monitoring component 440 may execute on messaging server devices 770 in order to more efficiently monitor and access messaging activity. In these embodiments, the administrator management component 340, interaction processing component 380, and scam action component 460 may execute on distinct server devices to perform batch updating of the scam message model 485. In general, in various embodiments various configurations of components may be distributed across various server devices.

The server devices 750, 760, 770 may communicate with each other over communications media 712 using communications signals 714. The server devices 750, 760, 770 may further communicate with a plurality of user client devices 725 each executing a user client 720, such as a messaging client, messaging commerce client, and/or social-networking client. As such, the distributed server devices 750, 760, 770 may provide, using distributed server devices, messaging operations, messaging-based marketplace operations, and scam detection and prevention operations for users of the user client devices 725.

Figure 8:
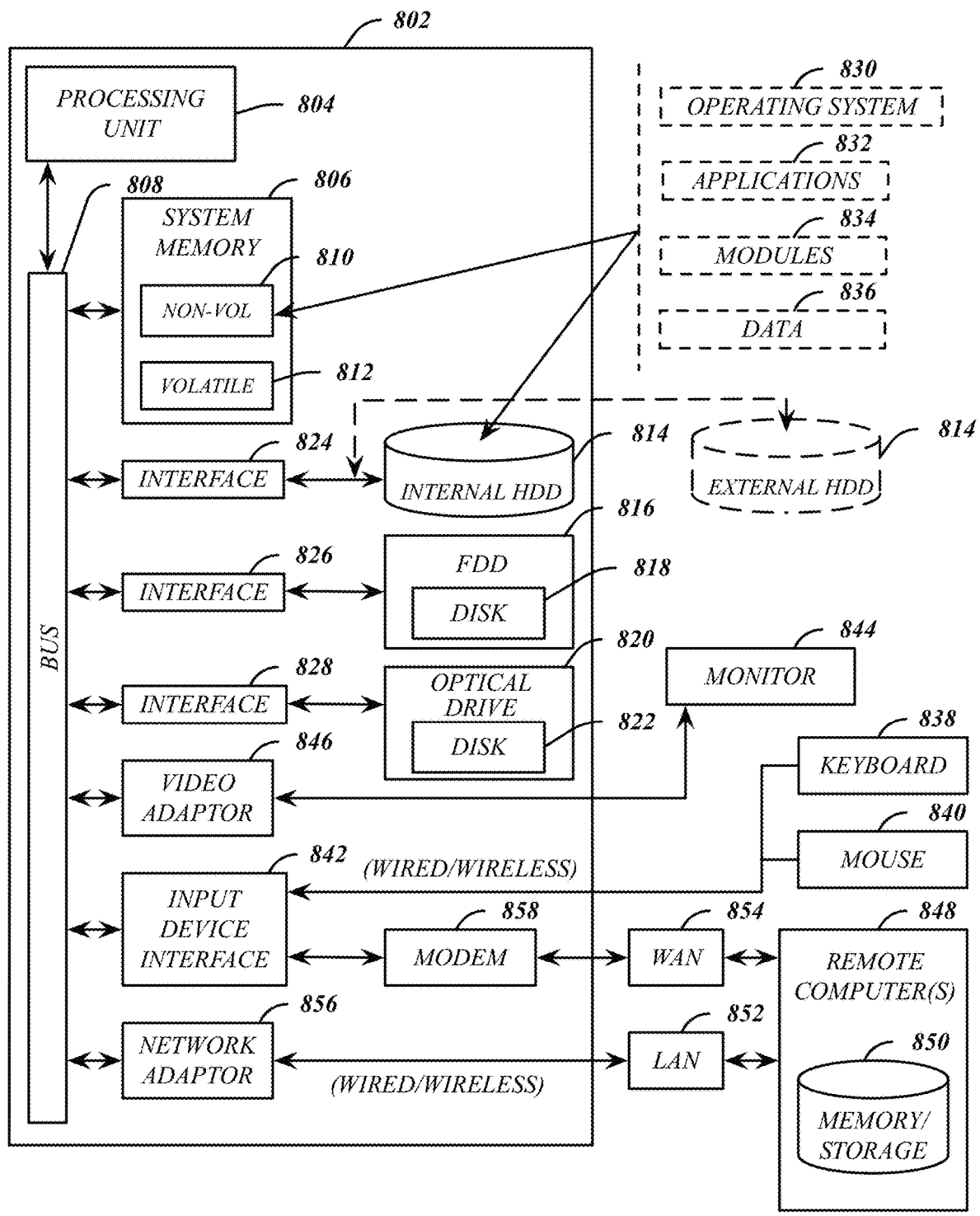
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 6, 7, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the scam detection and prevention system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
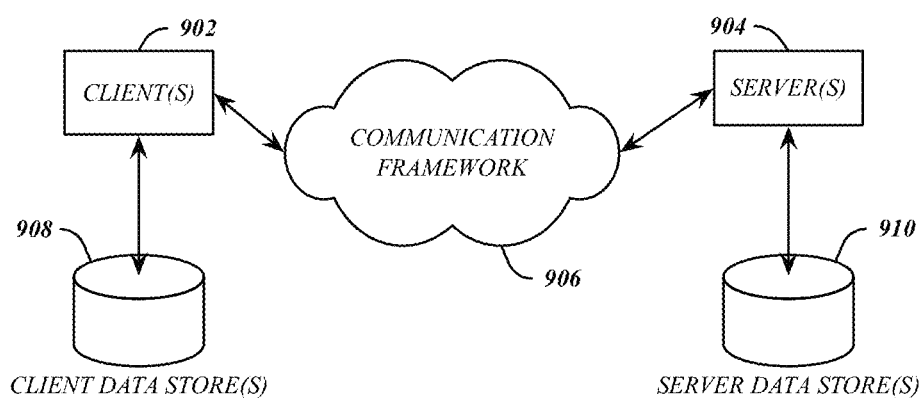
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may correspond to various client devices. The servers 904 may correspond to various server devices. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
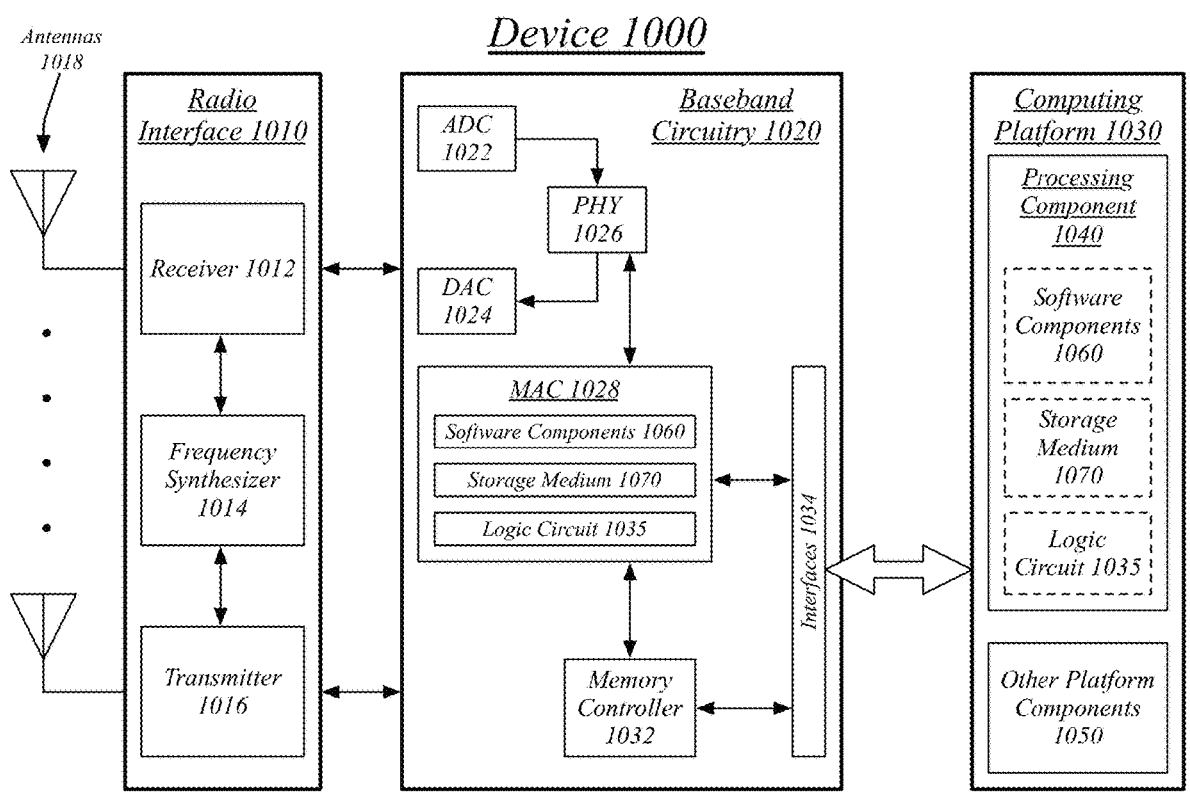
FIG. 10 illustrates an embodiment of a radio device architecture.

FIG. 10 illustrates an embodiment of a device 1000 for use in a multicarrier OFDM system, such as the scam detection and prevention system 100. Device 1000 may implement, for example, software components 1060 as described with reference to scam detection and prevention system 100 and/or a logic circuit 1035. The logic circuit 1035 may include physical circuits to perform operations described for the scam detection and prevention system 100. As shown in FIG. 10, device 1000 may include a radio interface 1010, baseband circuitry 1020, and computing platform 1030, although embodiments are not limited to this configuration.

The device 1000 may implement some or all of the structure and/or operations for the scam detection and prevention system 100 and/or logic circuit 1035 in a single computing entity, such as entirely within a single device. Alternatively, the device 1000 may distribute portions of the structure and/or operations for the scam detection and prevention system 100 and/or logic circuit 1035 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1056 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames, such as radio frames. Alternatively or in addition, MAC processing circuit 1028 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the scam detection and prevention system 100 and logic circuit 1035 using the processing component 1040. The processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 1002.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise generating a scam message example repository; submitting the scam message example repository to a natural-language machine learning component; receiving a scam message model from the natural-language machine learning component in response to submitting the scam message example repository; monitoring a plurality of messaging interactions with a messaging system based on the scam message model; determining a suspected scam messaging interaction of the plurality of messaging interactions; and performing a suspected scam messaging action with the messaging system in response to determining the suspected scam messaging interaction.

A computer-implemented method may further comprise wherein monitoring the plurality of messaging interactions includes automated translation of one or more of the messaging interactions.

A computer-implemented method may further comprise the natural-language machine learning component based on a temporal convolution network.

A computer-implemented method may further comprise the scam message model based on distinguishing between high-confidence determined scam message samples and general messaging interaction samples.

A computer-implemented method may further comprise the scam message model based on individual messages.

A computer-implemented method may further comprise the scam message model based on sequenced orderings of messages.

A computer-implemented method may further comprise the messaging interactions corresponding to one or more of user-to-user messaging, user-to-business messaging, and user-to-page messaging.

A computer-implemented method may further comprise the messaging interactions corresponding to a messaging-based marketplace.

A computer-implemented method may further comprise determining a recognition measure for the suspected scam messaging interaction based on the scam message model; and selecting the suspected scam messaging action from a plurality of suspected scam messaging actions based on the recognition measure.

A computer-implemented method may further comprise the plurality of suspected scam messaging actions comprising two or more of a shadow ban action, an explicit ban action, a scam education action, a scam reporting tool promotion action, and a human review flagging action.

A computer-implemented method may further comprise monitoring a second plurality of messaging interactions with the messaging system; determining a plurality of suspicious messaging interactions based on a message content reuse measure; flagging the plurality of suspicious messaging interactions for review; receiving a plurality of confirmed scam messaging interactions of the plurality of suspicious messaging interactions; and including the plurality of confirmed scam messaging interactions in the scam message example repository.

A computer-implemented method may further comprise the message content reuse measure distinguishing between broadly-common message content and narrowly-reused message content.

A computer-implemented method may further comprise separating each confirmed scam messaging interaction of the plurality of confirmed scam messaging interactions into one or more scammer-sent messages, wherein including the plurality of confirmed scam messaging interactions in the scam message example repository comprises including the one or more scammer-sent messages for each confirmed scam messaging interaction in the scam message example repository.

A computer-implemented method may further comprise collecting a sample of messaging interactions with the messaging system; and including the sample of messaging interactions in the scam message example repository as example non-scam messages.

A computer-implemented method may further comprise anonymizing the sample of messaging interactions for inclusion in the scam message example repository.

A computer-implemented method may further comprise augmenting the sample of messaging interactions based on one or more of user scam reporting, administrator scam flagging, and regular-expression scam-flagging rules.

An apparatus may comprise an interaction processing component operative to generate a scam message example repository; submit the scam message example repository to a natural-language machine learning component; and receive a scam message model from the natural-language machine learning component in response to submitting the scam message example repository; an interaction monitoring component operative to monitor a plurality of messaging interactions with a messaging system based on the scam message model; and determine a suspected scam messaging interaction of the plurality of messaging interactions; and a scam action component operative to perform a suspected scam messaging action with the messaging system in response to determining the suspected scam messaging interaction. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
    receiving a plurality of monitored messaging interactions associated with a plurality of users including a target user, wherein at least one of the messaging interactions comprises a message associated with the target user;
    determining a message reuse measure for the at least one messaging interaction, the message reuse measure to compare the reuse of the message by the target user to the reuse of the message in the plurality of monitored messaging interactions;
    flagging the messaging interaction as being suspicious based on the message reuse measure;
    using the flagged messaging interaction to generate a scam message model; and
    determining a level of scam behavior for a new message having a message sender and a message recipient based on a degree of recognition of scam behavior in the new message according to the scam message model.

2. The computer-implemented method of claim 1, further comprising:
    monitoring real-time or near real-time messaging interactions using the scam message model.

3. The computer-implemented method of claim 1, further comprising:
    determining a low-confidence match to scam according to the new message's level of scam behavior being below a threshold, and
    not taking preventative action in response to the determination of the low-confidence match.

4. The computer-implemented method of claim 1, further comprising:
    determining a high-confidence match to scam according to the new message's level of scam behavior being above a threshold, and
    taking immediate preventative action in response to the determination of the high-confidence match, wherein the preventative action is determined according to the new message's level of scam behavior and the preventative action comprises at least one of:
    enacting an explicit ban of the message sender,
    enabling a shadow ban of the message sender,
    providing scam education for the message recipient, and
    promotion of scam-related tools to the message recipient.

5. The computer-implemented method of claim 1, further comprising:
    identifying a low-confidence threat according to the new message's level of scam behavior exceeding a low-confidence threshold while not exceeding a high-confidence threshold, and
    queueing the low-confidence threat for review by a human administrator.

6. An apparatus, comprising:
    a message reuse monitoring component operative to:
        receive a plurality of monitored messaging interactions associated with a plurality of users comprising a target user, wherein at least one of the messaging interactions comprises a message associated with the target user;
        a message reuse measure for the at least one messaging interaction, the message reuse measure to compare the reuse of the message by the target user to the reuse of the message in the plurality of monitored messaging interactions; and
        flag the messaging interaction as being suspicious based on the message reuse measure;
    a natural-language machine learning component operative to use the flagged messaging interaction to generate a scam message model; and
    an interaction monitoring component operative to determine a level of scam behavior for a new message associated with a message sender and a message recipient based on a degree of recognition of scam behavior in the new message according to the scam message model.

7. The apparatus of claim 6, further comprising:
    an interaction monitoring component operative to monitor a real-time or near real time messaging interaction using the scam message model.

8. The apparatus of claim 6, further comprising:
    the interaction monitoring component operative to determine a low-confidence match to scam according to the new message's level of scam behavior being below a threshold, and
    a scam action component operative to withhold from taking preventative action in response to the determination of the low-confidence match.

9. The apparatus of claim 6, further comprising:
    the interaction monitoring component operative to determine a high-confidence match to scam according to the new message's level of scam behavior being above a threshold, and a scam action component operative to take immediate preventative action in response to the determination of the high-confidence match, wherein the preventative action is determined according to the new message's level of scam behavior and the preventative action comprises at least one of:
an explicit ban of the message sender,
enabling a shadow ban of the message sender,
providing scam education for the message recipient, and
promotion of scam-related tools to the message recipient.

10. The apparatus of claim 6, further comprising:
a scam action component operative to identify a low-confidence threat according to the new message's level of scam behavior exceeding a low-confidence threshold while not exceeding a high-confidence threshold and queue the low-confidence threat for review by a human administrator.

11. At least one non-transitory computer-readable storage medium comprising instructions configured to, when executed, cause a system to:
receive a plurality of monitored messaging interactions associated with a plurality of users including a target user, wherein at least one of the messaging interactions comprises a message associated with the target user;
determine a message reuse measure for the at least one messaging interaction, the message reuse measure to compare the reuse of the message by the target user to the reuse of the message in the plurality of monitored messaging interactions;
flag the messaging interaction as being suspicious based on the message reuse measure
use the flagged messaging interaction to generate a scam message model; and
determine a level of scam behavior for a new message having a message sender and a message recipient based on a degree of recognition of scam behavior in the new message according to the scam message model.

12. The non-transitory computer-readable storage medium of claim 11, the instructions further configured to, when executed, cause the system to:
monitor real-time or near real-time messaging interactions using the scam message model.

13. The non-transitory computer-readable storage medium of claim 11, the instructions further configured to, when executed, cause the system to:
determine a high-confidence match to scam according to the new message's level of scam behavior being above a threshold, and
take immediate preventative action in response to the determination of the high-confidence match, wherein the preventative action is determined according to the new message's level of scam behavior and the preventative action comprises at least one of:
enacting an explicit ban of the message sender,
enabling a shadow ban of the message sender,
providing scam education for the message recipient, and
promotion of scam-related tools to the message recipient.

14. The non-transitory computer-readable storage medium of claim 11, the instructions further configured to, when executed, cause the system to:
identify a low-confidence threat according to the new message's level of scam behavior exceeding a low-confidence threshold while not exceeding a high-confidence threshold, and queue the low-confidence threat for review by a human administrator.

* * * * *